Aug. 11, 1936.   C. GARDNER   2,050,603
ENGINE
Filed March 11, 1933   4 Sheets-Sheet 1
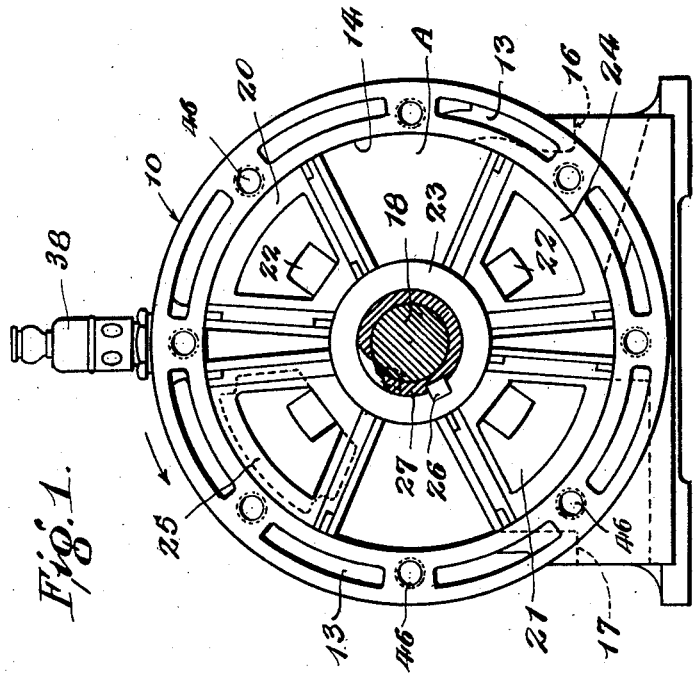
Fig. 1.
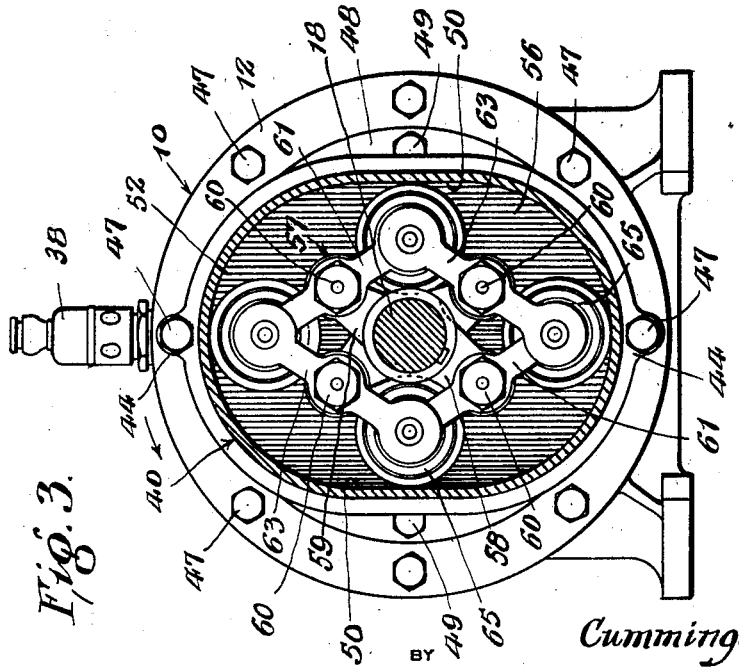
Fig. 3.
INVENTOR
*Cummings Gardner,*
ATTORNEY

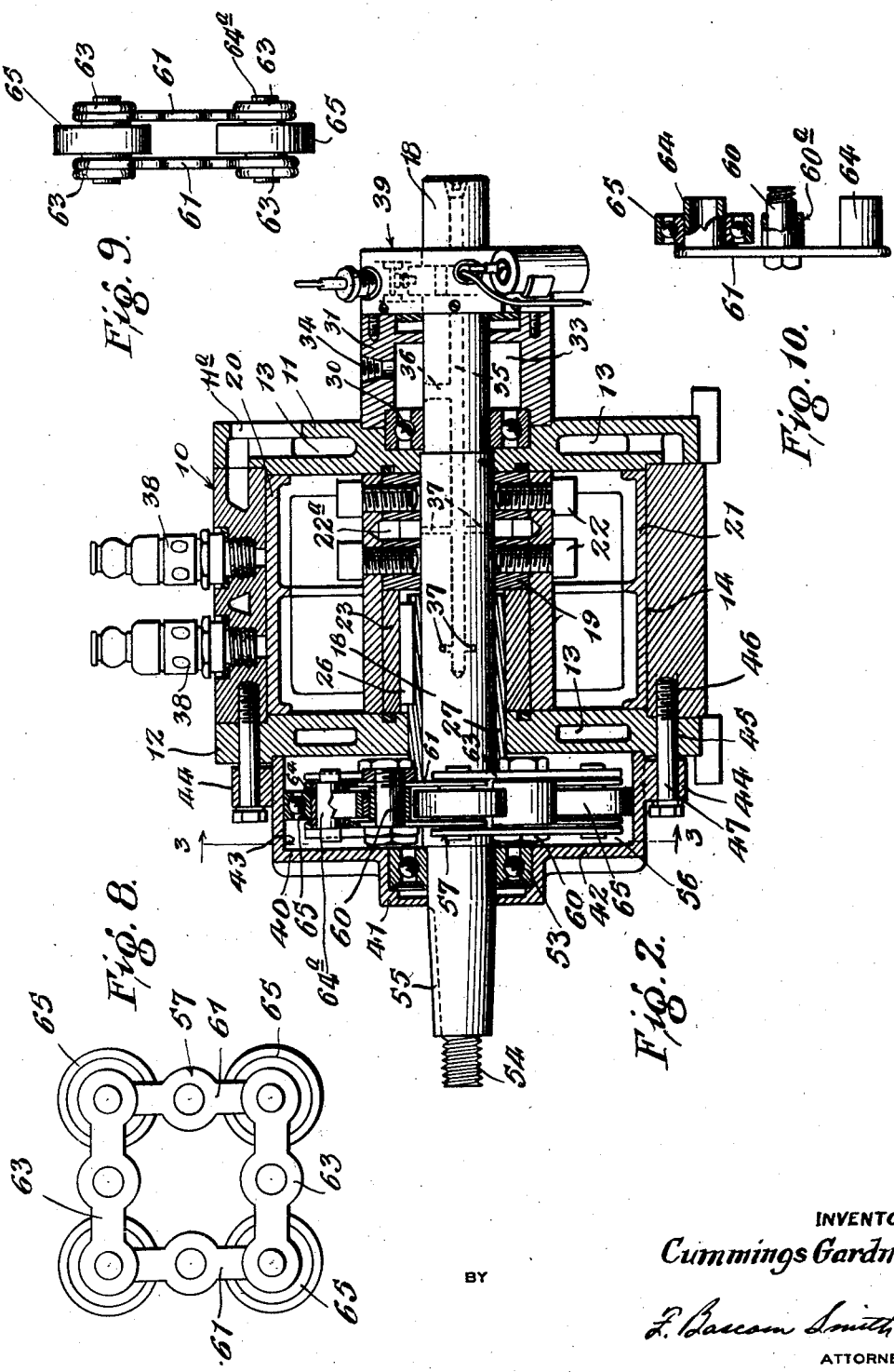

Aug. 11, 1936.  C. GARDNER  2,050,603
ENGINE
Filed March 11, 1933  4 Sheets-Sheet 3
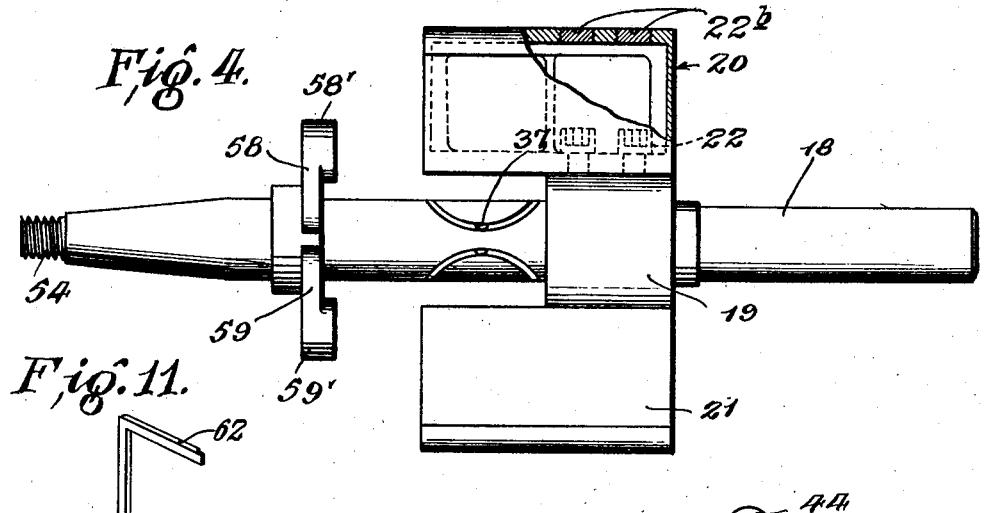
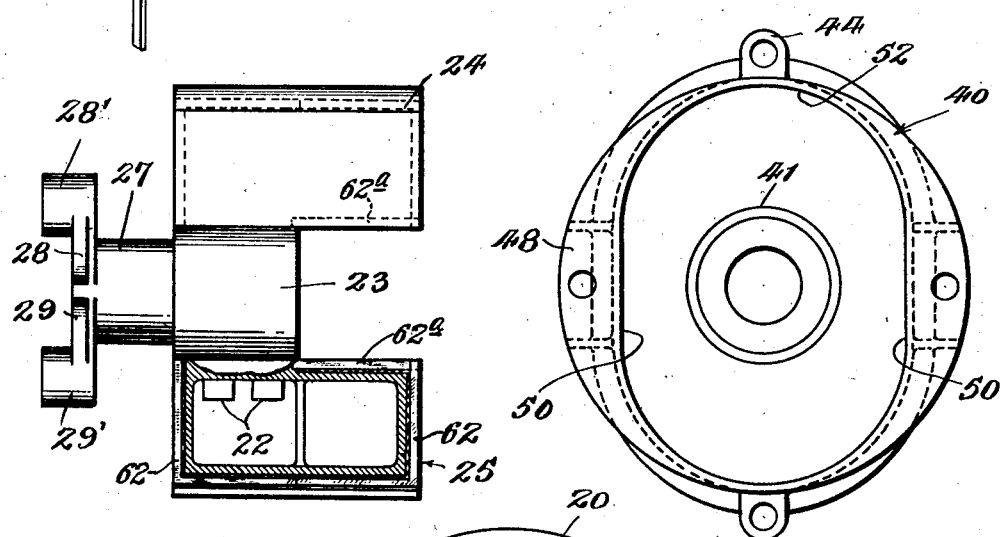
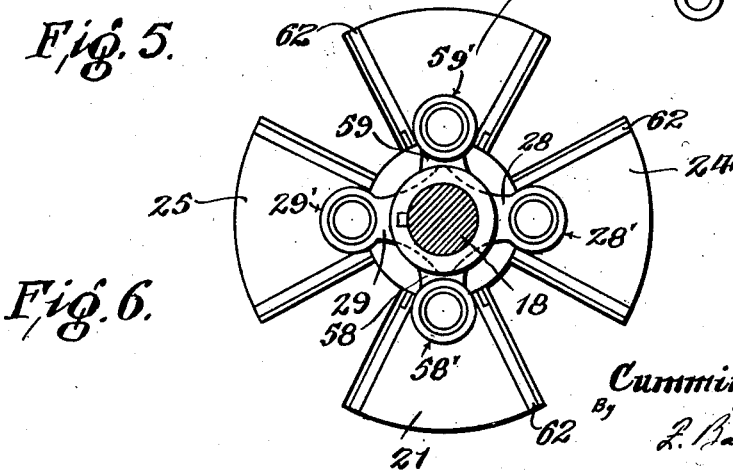
INVENTOR
*Cummings Gardner,*
By
ATTORNEY

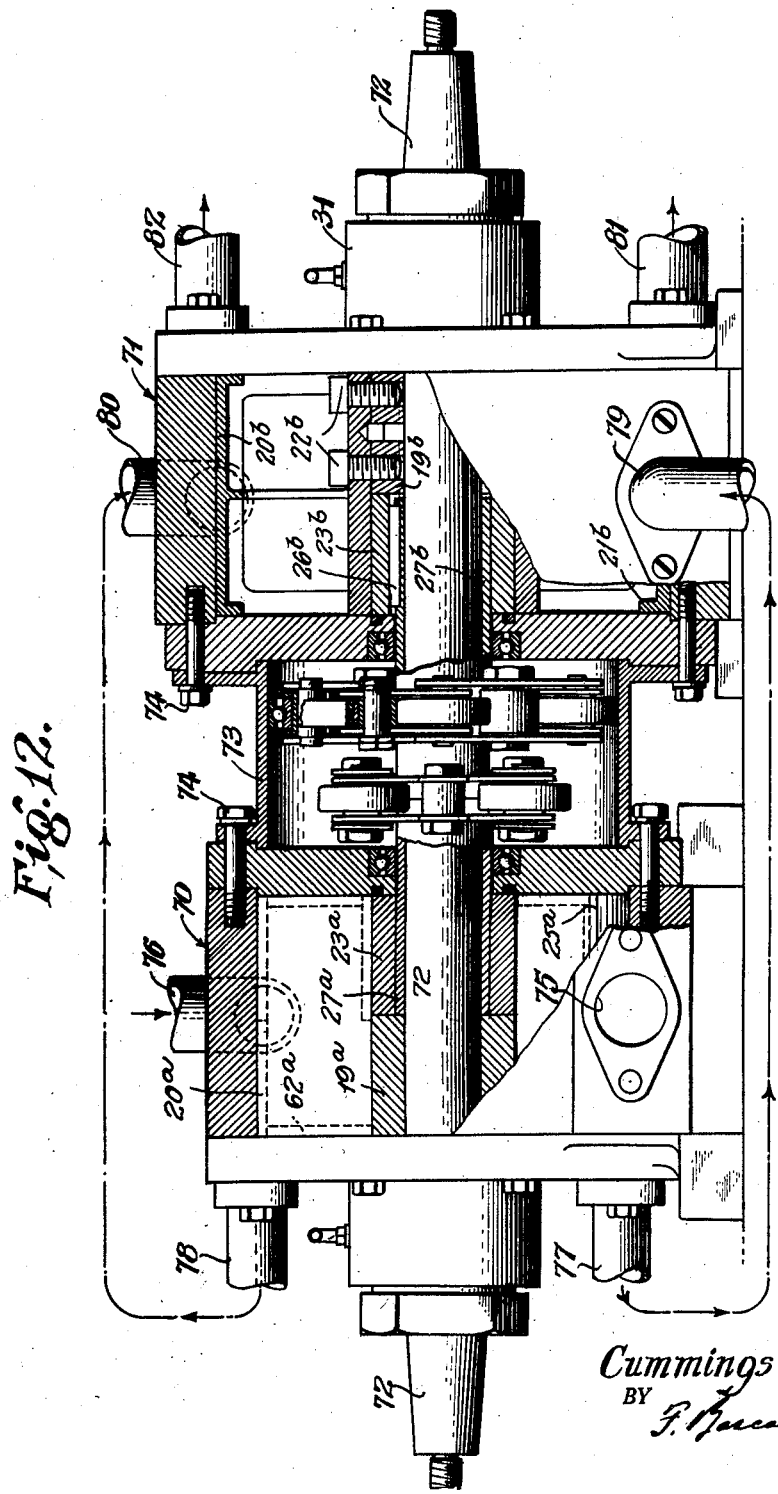

Patented Aug. 11, 1936

2,050,603

UNITED STATES PATENT OFFICE 2,050,603

ENGINE

Cummings Gardner, Los Angeles, Calif.

Application March 11, 1933, Serial No. 660,344

9 Claims. (Cl. 123—11)

This invention relates to engines, and more particularly to engines of the rotary type.

One of the objects of the present invention is to provide a novel rotary engine of small size, as compared with the usual reciprocating engine of like power, of light weight, rugged construction and a small number of parts, the latter being symmetrically and coaxially arranged, whereby vibration is avoided and long life is insured.

Another object of the invention is to provide a rotary engine wherein the pistons and power shaft are operatively connected in a novel manner such that the construction is greatly simplified and losses of power from sliding friction, such as have heretofore been present in engines of the above type, are eliminated.

Another object is to provide a rotary engine wherein certain of the pistons are secured directly to the power shaft and move with said shaft at a constant speed, whereby the number of engine parts may be materially reduced and the efficiency thereof increased.

Another object is to provide novel compression sealing means for engines of the above type.

Another object is to provide a novel rotary engine which may be readily adapted for use either as an internal combustion engine or other type of fluid expansion engine, such as a steam engine, for example.

A further object is to provide a rotary engine having novel control means for operatively connecting pistons having variable angular movement with the constant speed power shaft whereby said engine is rendered extremely rugged, durable and efficient in construction and operation.

The above and other objects and advantages of the invention will appear more fully hereinafter in the detailed description which is to be considered in connection with the accompanying drawings. It is to be expressly understood, however, that the drawings are for the purposes of illustration only and are not designed as a definition of the limits of the invention, reference being had for this purpose to the appended claims. In the drawings:

Fig. 1 is an end view, partly in section, of one embodiment of the present invention with an end plate removed;

Fig. 2 is a longitudinal axial view, in section, of one embodiment of the invention;

Fig. 3 is a section taken along the line 3—3 of Fig. 2;

Fig. 4 is a detail view, with parts broken away, illustrating one form of pistons and power shaft which may be employed in carrying out the invention;

Fig. 5 is a detail view, with parts broken away, illustrating a pair of pistons adapted to be associated with the shaft and pistons shown in Fig. 4;

Fig. 6 is a detail end view illustrating the parts of Figs. 4 and 5 in an assembled relation;

Fig. 7 is an end view illustrating one form of cam which is preferably employed in the construction constituting the present invention;

Fig. 8 is a side elevation illustrating one form of roller and linkage mechanism which may be employed;

Fig. 9 is an end view of the parts shown in Fig. 8;

Fig. 10 is a detail, with parts broken away, illustrating one manner in which the rollers of Fig. 9 may be associated with the links;

Fig. 11 is a detail view of a preferred form of sealing element which may be employed; and Fig. 12 is a side elevation, partly in section and with parts broken away, illustrating a second embodiment of the invention.

Referring more particularly to Fig. 2, one embodiment of the engine of the present invention comprises an open-ended cylinder block 10 closed by end plates 11 and 12 which are bolted or otherwise suitably secured to the cylinder. The walls of the cylinder block and the end plates are provided interiorly with passages 13 for a suitable cooling medium, such as water, which may be circulated through said passages in any suitable manner as is well known in the art. The inlet passage for the cooling medium (not shown) is preferably provided adjacent the exhaust outlet for burnt gases, to be described more fully hereinafter, while an outlet 11a for the cooling medium is preferably provided in end plate 11 adjacent the top thereof.

An opening 16 (Fig. 1) in the cylinder block constitutes an inlet port for a combustible and is operatively connected to a fuel feeding device (not shown), such as a carburetor. The burned gases are exhausted through an opening 17 provided in the block 10. As will be understood, by those skilled in the art, the ports 16 and 17 may be provided in other positions than the ones illustrated, if desired, but the position of the ports for best efficiency bears a definite relation to the pistons and the openings provided for the spark plugs 38.

Extending coaxially through the engine cylinder, and through the end plates therefor, is a power shaft 18 to which is drivably connected, as by means of a key, or suitable splines, a hub 19 which extends longitudinally of the shaft from the inner face of end plate 11 to a point substantially midway of the length of that portion of the shaft within the cylinder. Extending radially from hub 19 and secured thereto as by means of screws or bolts 22 and dowel pins 22a, is a pair of diametrically-disposed, sector-shaped pistons 20 and 21, this construction being such that said pistons are fixedly secured to, and rotate with, the shaft 18. It will be noted that pistons 20, 21 are of such length as to extend from the inner face of one end plate to the inner face of the opposite end plate, but are spaced from the shaft by means of hub 19. Surrounding the power shaft, in the space provided by the overhanging portions of pistons 20, 21, is a hub 23 which has integrally formed therewith another pair of sector pistons 24, 25, these diametrically disposed pistons extending into the space between pistons 20 and 21 and being of the same length as the latter. Hub 23 is rigidly secured to a sleeve 27 as by means of a key 26, or splines, the sleeve 27 being mounted for relative but controlled angular movement with respect to shaft 18. The outer end of the sleeve extends through end plate 12 for a purpose to be described hereafter.

In Fig. 1, it will be noted that the sector pistons are hollow and open at the opposite ends. This construction facilitates the assembly of said pistons on hubs 19 and 23. In certain instances, however, it is desirable to form the pistons in such a manner that the opposite ends thereof are closed, and this construction is shown more clearly in Figs. 4 and 6, wherein openings are provided in the outer curved walls of the pistons in order that the set screws 22 may be introduced therethrough to secure the inner walls of the pistons to the hubs. The openings are thereafter closed by plugs 22b which are preferably threaded and slightly tapered.

In order to provide for high efficiency, novel compression sealing means are provided and, as shown more clearly in Figs. 5 and 11, said sealing means are preferably constituted by sealing blades 62 and 62a fitted into grooves in the pistons. The grooves extend continuously from one end of the piston across the outer face thereof, across the opposite end and continue across the inner face of the piston to a position slightly beyond the hub portion thereof. The sealing members or blades do not extend continuously throughout the grooves but are preferably constituted by a pair of L-shaped elements, one leg of the L extending continuously from the hub along the end face of the piston to the outer face thereof and along said outer face to a point substantially midway of the length thereof, a similar shaped element being provided for the opposite end of the piston. A straight sealing element 62a is positioned in that portion of the groove provided in the overhanging inner wall of the piston, such that the same is adapted to lightly engage the hub of the opposite pair of blades. The adjacent ends of each element have an overlapping or step-joint connection. Three elements are thus employed to form a complete sealing blade or member. Suitable means, such as sinuous springs, are provided for maintaining the three elements of the sealing blade in engagement with the adjacent surfaces. While any desired number of sealing blades or members may be employed, it has been found in actual practice that a compression of ninety pounds may be readily obtained by the use of four such members per piston. Only two sealing members per piston are shown, however, in the drawings.

Novel control means are provided for operatively connecting pistons 24 and 25 with the power shaft 18 and pistons 20, 21 in such a manner that the resultant of the forces developed by the explosion of the combustible charges in the cylinder is transmitted to the power shaft to rotate the same; and said control means is effective to impart relative angular motion to pistons 20, 21 and 24, 25 to provide for the introduction of a combustible charge into the cylinder, the compression of said charge for firing, and the exhausting of the burned charge through the port 17. For this purpose, the outwardly extending end of sleeve 27 is provided with a pair of diametrically disposed arms 28, 29 which, in the form shown, are in the same radial plane as the pistons 24, 25, and which are provided with enlarged and laterally extending apertured portions 28', 29' (Fig. 5) on the outer ends thereof. Extending through the apertures in portions 28', 29' are studs or pins 60 (Fig. 10) which are surrounded by spacing and bearing sleeves 60a, said pins and sleeves constituting pivot means for pairs of laterally spaced links 61. The links are pivoted intermediate the ends thereof to said arms and at their opposite ends to pairs of links 63 as by means of pins 64a (Fig. 2) which extend through bearing sleeves 64 which have a press fit in apertures provided adjacent the ends of links 61. All of the links 61, 63 are of the same length and are arranged in pairs which extend between the opposite ends of the various pivot members. Links 63 are pivoted intermediate their ends by means of pins 60 to the apertured and laterally extending portions 58', 59' (Fig. 4) of a pair of diametrically disposed arms 58, 59, rigidly secured as by means of splines or keys to the power shaft 18, said arms, in the form shown, being in the same axial plane as pistons 20, 21.

The linkage above described is effective to operatively transmit the power impulses received from the pistons to the power shaft and, in order to insure that said pistons will have a relative oscillatory movement, whereby the proper cycle of intake, compression, firing and exhaust may be obtained, said linkage is operatively associated with a suitable cam 40 (Figs. 3 and 7) by means of large diameter, antifriction rollers 65 which are mounted between pairs of links 61, 63 on the sleeves 64, four such rollers being provided in the illustrated embodiment. The double parallelogram construction described is extremely compact and is effective to transmit the forces evenly to the various parts.

Engagement is had at all times between rollers 65 and the cam 40 and, to this end, the cam is generally of elliptical shape, but the opposite walls along the short diameter of the ellipse are parallel for a substantial portion of their length, as shown at 50. This construction not only insures that the movement of pistons 24, 25, with respect to the power shaft and pistons 20, 21, will be properly controlled but results in a cam which is relatively inexpensive to manufacture. The particular contour of the cam is such as to occupy minimum space, permit the use of large diameter rollers, and insure smooth running.

As illustrated, the cam is formed on the inner wall of a housing member 42 which encloses the linkage mechanism and which is supplied with laterally extending lugs 44 and flanges 46 that are suitably apertured to receive bolts 47 and 49 (Fig. 3) for securing said housing to the end plate 12 and cylinder block 10. The housing 42 is provided with an enlarged journal portion 41 to receive a suitable bearing 53 for power shaft 18. The opposite end of shaft 18 is journaled in an anti-friction bearing 30 suitably mounted in end plate 11. Attention is called to the relatively short length of housing 42. This is made possible by the pairs of links and by the arrangement of arms 28, 29 and 58, 59 and their oppositely extending end portions, which latter overlap. This arrangement also permits the use of large diameter rollers 65 with a consequent saving in bearing wear, a portion of the arms being recessed, as shown in Figs. 4 and 5 (the recesses being dotted in Fig. 6), to provide the necessary clearances for the peripheries of the rollers.

Lubrication for the engine may be provided by mixing oil with the fuel and, as shown in Fig. 2, the end plate 11 may be fitted with a cylindrical casing 31 to receive a lubricant under pressure which is conveyed by channels 35, 36, 37 in the power shaft to suitable points along the length thereof. Additionally, housing 42 is preferably filled with lubricant to insure proper lubrication of the control mechanism.

In the present engine, the firing of the combustible charges introduced therein always occurs at the same point in the cylinder and the ignition system is, accordingly, simplified. One or more spark plugs are fitted in suitable openings in the cylinder wall and are connected to a timing device comprising an annular housing member 39 secured to end plate 11 by means of casing 31, said housing member surrounding the power shaft 18. A cam 39ª is mounted on shaft 18 (Fig. 2) in the plane of member 39, and said cam is adapted to close a pair of breaker points 39ᵇ suitably mounted within said member 39, the action of the cam and breaker points being well understood by those skilled in the art.

In operation, the engine is cranked by any suitable starter mechanism, such as an electric starter, operatively connected to the power shaft. As pistons 20 and 24, for example, are rotated in an anti-clockwise direction (Fig. 1) past inlet port 16, the cam and link control mechanism is effective to move piston 24 more slowly than piston 20, whereby the chamber A formed between the adjacent walls of said pistons and the inner wall of cylinder 10 increases in volume. A suction is thus created in the inlet port 16 and a combustible charge is drawn into said chamber. As inlet port 16 is closed by piston 24, the control mechanism is effective to move said piston more rapidly than the constantly rotating piston 20 so that the volume of chamber A is decreased and the charge in said chamber is compressed.

When the parts have been rotated such that pistons 20 and 24 occupy the same positions as those of pistons 25 and 26, respectively, of Fig. 1, the timing device and spark plugs 38 are effective to fire the compressed charge in chamber A, whereupon the engine operates under its own power, the explosive force of the charge being converted by the control mechanism into a resultant force effective to rotate the power shaft, as will be understood by those skilled in the art. The control mechanism is also effective to produce relative movement between adjacent pistons to decrease the space therebetween as they rotate past the exhaust outlet 17 whereby the engine is properly scavenged. It will be noted that when two pairs of pistons are employed, as shown in the illustrated embodiment of the invention, four explosions are obtained for each revolution of the power shaft whereby smooth operation and high power output are secured.

As pointed out above, the engine of the present invention may be readily adapted for use as an internal combustion engine, either gasoline or Diesel, or as a fluid expansion engine, such as a steam engine.

In Fig. 12, there is illustrated a novel form of a two-stage engine particularly adapted for use as a fluid expansion engine. As shown, the same comprises a pair of cylinders which are laterally spaced and are coaxial one with the other. The high pressure cylinder 70 is of less volume than the low pressure cylinder 71 as is usual in engines of this character. A continuous power shaft 72 extends through each of the cylinders and projects beyond the ends thereof a sufficient distance to enable the necessary connections to be made for the load to be driven, the starter or other auxiliaries. A housing 73 is rigidly connected as by means of bolts 74 to the adjacent end walls of the cylinders, and positioned within said housing are control means of the character described above in connection with the engine shown in Fig. 2. In the illustrated embodiment, two such control means are shown, one for each cylinder, and the inner surface of the housing 73 constitutes the cam for said control means. In order to increase the smoothness and efficiency of operation of the two-cylinder engine shown, it is desirable that the pistons which are rigidly connected to the power shaft 72 be secured to said shaft in such a position that the pistons in one cylinder are angularly displaced with respect to the pistons in the other cylinder. By this construction, overlapping impulses are secured by the use of the two cylinders. In the embodiment illustrated pistons 20b, 21b in cylinder 71 are disposed on shaft 72 at an angle of approximately 35° relative to the corresponding pistons in cylinder 70. The construction and mounting of the pistons is similar to that shown in Fig. 2. It will be understood that the pistons in the two cylinders may be disposed at any suitable relative angle.

Steam or other expansible fluid may be introduced into the high pressure cylinder 70 through a pair of inlets 75 and 76 positioned at suitable points in the periphery of the cylinder wall. The fluid exhausted from cylinder 70 may be conducted through two suitable conduits 77 and 78, a portion only of the latter being shown, to suitable inlets 79 and 80 in the low pressure cylinder, the exhaust from the latter being through conduits 81 and 82, for example.

The construction shown in Fig. 12 is particularly advantageous for use in high H. P. installations and where overlapping impulses are desired. Since the over-all diameter of such an engine is small, the tandem arrangement shown is particularly adapted for aviation uses where low head resistance is a major factor.

There is thus provided a novel rotary engine which is extremely simple in construction, efficient in operation, small in size, and light in weight. The complexity and friction losses present in engines of the rotary type heretofore provided are avoided in the present invention due, among other reasons, to the fact that certain of the pistons are rigidly connected directly to the power shaft. In one structural embodiment of the invention, it has been found perfectly feasible to develop 18 H. P. in a cylinder whose internal dimensions are approximately four inches in length and six and one-half inches in diameter, and with the power shaft rotating at a relatively low speed.

The use of double links in the control mechanism permits a disposition of the rollers and the pivot pins for the links such that a single plane at right angles to the power shaft passes through the center of said rollers and pins, and an extremely compact arrangement is obtained. The links may be readily formed as stampings, thereby reducing cost. Additionally, the use of pairs of links insures an even distribution of the forces on all the working parts, whereby the life of the latter is increased. As pointed out above, the structure is readily adaptable for use as a fluid expansion engine or an internal combustion engine of the gasoline or Diesel types. Various changes may be made in the details of construction and arrangement of parts as will readily occur to those skilled in the art, and reference will, accordingly, be had to the appended claims for a definition of the limits of the invention.

What is claimed is:

1. In apparatus of the class described, a pair of laterally spaced and coaxially disposed cylinders, a shaft extending coaxially through said cylinders, a plurality of pistons positioned in said cylinders, control mechanism operatively connected to said pistons and shaft, said control mechanism being mounted on the central portion of the shaft, and a housing surrounding said control mechanism and operatively connected to the adjacent ends of the cylinders, the inner surface of said housing constituting a cam surface for the control mechanism.

2. In an engine of the class described, a pair of laterally spaced cylinders in coaxial alignment, a power shaft extending through said cylinders, a plurality of pistons in each of said cylinders rigidly connected to said shaft, a plurality of pistons mounted in each of said cylinders for movement relative to said shaft, control means for operatively connecting said relatively movable pistons to said shaft including a housing member interposed between said cylinders and rigidly connected thereto, the inner surface of said housing member forming a cam, and means operatively connected to said shaft and relatively movable pistons, said means having operative engagement with said cam.

3. In a rotary engine, a pair of coaxial and laterally spaced cylinders, a power shaft extending through said cylinders, a plurality of pistons in each of said cylinders rigidly secured to said shaft, the pistons in one cylinder being angularly displaced on the shaft with respect to the pistons in the other cylinder, a plurality of pistons in each of the cylinders adapted for limited rotary movement relative to said shaft, and control means for said relatively movable pistons, said control means being positioned between said cylinders.

4. In a rotary engine, a high pressure cylinder, a low pressure cylinder, said cylinders being disposed coaxially and one of said cylinders having a greater volume than the other, a continuous power shaft extending through said cylinders, a housing operatively connected to adjacent ends of the cylinders, cam means in said housing, sector-like pistons in said cylinders, control mechanism for the pistons adapted to cooperate with said cam means, and means for conducting an expansible fluid exhausted from the high pressure cylinder into the low pressure cylinder.

5. In apparatus of the class described, a uniformly rotating power shaft, pistons rigidly connected to said shaft for uniform rotation therewith, and pistons movable relative to the power shaft and said uniformly rotating pistons, the combination with said pistons and shaft of means for controlling the movement of the relatively movable pistons with respect to the uniformly rotating pistons, said means comprising a pair of diametrically disposed arms rigidly connected to said power shaft, a pair of diametrically disposed arms rigidly connected to the relatively movable pistons, a single pair of links pivotally secured intermediate the ends thereof to the outer end of each of said arms, the links of each pair being positioned on opposite sides of the arm to which the same are secured, means pivotally connecting adjacent ends of said pairs of links, a roller carried by each of said connecting means, said pairs of links constituting a parallelogram with said rollers at the apices thereof, the centers of said rollers and the centers of the outer ends of all of said arms being in a common plane perpendicular to the axis of the power shaft, and an internal cam housing surrounding said rollers and having engagement therewith.

6. In an engine, a cylinder, means for closing the opposite ends of the latter, a uniformly rotating power shaft disposed coaxially within said cylinder and projecting from one end thereof, pistons in said cylinder, certain of said pistons being adapted for angular movement relative to the shaft and others being rigidly mounted thereon, and control means for said angularly movable pistons comprising a plurality of arms rigidly secured to the projecting end of said shaft, said arms having portions adjacent the outer ends thereof extending longitudinally of said shaft, a plurality of arms rigidly secured to said angularly movable pistons and having portions adjacent the outer ends thereof extending longitudinally of said shaft, the arms being positioned so that said longitudinally extending portions overlap one another, pairs of links pivotally connected at the centers thereof to said arms adjacent the outer ends of the latter, rollers carried between the ends of said pairs of links, the centers of said rollers and the centers of the outer ends of said arms including the longitudinally extending portions being in a common plane perpendicular to the axis of said power shaft, and a cam engaged by said rollers.

7. In an engine, a power cylinder, a uniformly rotating power shaft coaxial therewith and extending therethrough, a plurality of sector pistons secured to said shaft, a plurality of sector pistons mounted on said shaft for angular movement relative thereto, said first and second named pistons being alternately arranged within said cylinder, control means connecting said first and second named pistons for controlling the angular movement of said second named pistons relative to said power shaft in a predetermined manner, said means including a pair of radially extending arms secured to said shaft, a pair of arms connected to said second named pistons and extending radially from said shaft, a pair of links pivotally secured to the outer end of each of said arms, means for pivotally connecting adjacent ends of said pairs of links, and rollers mounted on said last named means between the links of said pairs of links, the centers of said rollers lying in the plane of rotation of the centers of the outer ends of said arms, and cam means surrounding said control means for determining the paths of said rollers.

8. In apparatus of the class described, a cylinder, a shaft extending therethrough, pistons in the cylinder rigidly connected to said shaft, pistons in the cylinder mounted on said shaft for angular movement relative thereto, a sleeve rigid with said second named pistons and extending exteriorly of said cylinder, a pair of arms secured to said shaft, a pair of arms secured to said sleeve and relatively movable pistons, the ends of said arms having offset portions extending in opposite directions from one another, a plurality of rollers adapted to operate in a plane passing through the outer ends of said arms, means including pairs of links secured to said arms and constituting a parallelogram for operatively connecting said rollers to said arms, and a cam engaged by said rollers.

9. In apparatus of the class described, a uniformly rotating power shaft, pistons rigidly connected to the power shaft, and pistons movable relative to the power shaft, the combination with said pistons and shaft of control means comprising a pair of diametrically disposed arms rigidly connected to said power shaft, a pair of diametrically disposed arms rigidly connected to the relatively movable pistons, a single pair of links pivotally secured intermediate the ends thereof to the outer end of each of said arms, the links of each pair being positioned on opposite sides of the arm to which the same are secured, means pivotally connecting adjacent ends of said pairs of links, a roller carried by each of said connecting means whereby said rollers and arms are included between said pairs of links, the centers of said rollers and the centers of the outer ends of said arms being in a common plane perpendicular to the axis of the power shaft, and a cam engaged by the rollers.

CUMMINGS GARDNER.